United States Patent
Klaphake et al.

(10) Patent No.: US 12,291,267 B2
(45) Date of Patent: May 6, 2025

(54) OFF-ROAD VEHICLE ENGINE MOUNTING

(71) Applicant: Arctic Cat Inc., Thief River Falls, MN (US)

(72) Inventors: Ethan Randall Klaphake, Thief River Falls, MN (US); Derek Sorenson, Thief River Falls, MN (US); Todd Ethan MacDonald, Balderson (CA)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/395,929

(22) Filed: Dec. 26, 2023

(65) Prior Publication Data

US 2024/0227938 A1    Jul. 11, 2024

Related U.S. Application Data

(60) Provisional application No. 63/437,254, filed on Jan. 5, 2023.

(51) Int. Cl.
| | | |
|---|---|---|
| *B62D 21/11* | (2006.01) | |
| *B60K 5/00* | (2006.01) | |
| *B60K 5/12* | (2006.01) | |
| *B62D 25/08* | (2006.01) | |
| *B62D 27/02* | (2006.01) | |

(52) U.S. Cl.
CPC ............ *B62D 21/11* (2013.01); *B60K 5/1216* (2013.01); *B62D 25/082* (2013.01); *B62D 27/023* (2013.01); *B60K 2005/006* (2013.01); *B60K 5/1241* (2013.01)

(58) Field of Classification Search
CPC ................ B60K 5/1216; B60K 5/1241; B60K 2005/006; B62D 21/11; B62D 25/082; B62D 27/023
See application file for complete search history.

(56) References Cited

U.S. PATENT DOCUMENTS

| | | | | |
|---|---|---|---|---|
| 3,825,090 | A * | 7/1974 | Runkle | F16F 15/08 180/300 |
| 5,096,010 | A * | 3/1992 | Ojala | F02M 35/1266 123/184.56 |
| 6,679,523 | B2 * | 1/2004 | Yamamoto | B62D 21/11 180/311 |

(Continued)

FOREIGN PATENT DOCUMENTS

CN           211995132 U      11/2020

*Primary Examiner* — Laura Freedman
(74) *Attorney, Agent, or Firm* — Lowe Graham Jones PLLC

(57) ABSTRACT

The present disclosure relates to an off-road vehicle having different features such as an engine assembly, a frame having a frame structure, and a rear mount assembly facilitating easy installation of the engine assembly, and a method of installing the engine assembly. Embodiments of the present disclosure also describe a removable frame member facilitating the installation of the engine assembly from a seating area into a rearward portion of the vehicle. The removable frame member is positioned at least partially forward of the installed engine assembly and in a lateral direction of the vehicle. The frame structure and the rear mount assembly provide more efficient assembly of the engine and transmission assembly into a tight space envelope.

20 Claims, 10 Drawing Sheets

(56) References Cited

U.S. PATENT DOCUMENTS

| | | | | |
|---|---|---|---|---|
| 6,708,793 | B2* | 3/2004 | Witherspoon | B60K 5/1216 |
| | | | | 180/291 |
| 7,445,076 | B2* | 11/2008 | Shigematsu | B60K 5/1216 |
| | | | | 180/300 |
| 7,562,737 | B2* | 7/2009 | Miyahara | B60K 5/1208 |
| | | | | 180/300 |
| 7,588,117 | B2* | 9/2009 | Fukuda | B62D 21/155 |
| | | | | 180/291 |
| 7,600,769 | B2* | 10/2009 | Bessho | B60G 9/022 |
| | | | | 280/124.109 |
| 7,708,103 | B2* | 5/2010 | Okuyama | B60K 5/1216 |
| | | | | 180/291 |
| 8,511,416 | B2* | 8/2013 | Hiruma | B60K 1/00 |
| | | | | 180/291 |
| 8,776,939 | B2* | 7/2014 | Kuramoto | B60K 5/02 |
| | | | | 180/300 |
| 8,827,028 | B2 | 9/2014 | Sunsdahl et al. | |
| 9,452,670 | B2 | 9/2016 | Oshima et al. | |
| 9,463,686 | B2* | 10/2016 | Ohshita | B60K 11/06 |
| 9,988,116 | B2 | 6/2018 | Kirtland et al. | |
| 10,800,471 | B2 | 10/2020 | Kirtland et al. | |
| 10,875,595 | B2 | 12/2020 | Laberge et al. | |
| 10,906,602 | B2 | 2/2021 | Laberge et al. | |
| 10,981,600 | B2 | 4/2021 | Yamada et al. | |
| 11,014,419 | B2 | 5/2021 | Danielson et al. | |
| 11,198,404 | B2 | 12/2021 | Takii | |
| 2005/0173180 | A1* | 8/2005 | Hypes | B60K 17/16 |
| | | | | 475/2 |
| 2008/0078917 | A1 | 4/2008 | Roehrl et al. | |

\* cited by examiner

OFF-ROAD VEHICLE ENGINE MOUNTING

PRIORITY CLAIM

This application claims the benefit of priority from U.S. provisional patent application No. 63/437,254, filed Jan. 5, 2023, the contents of which are incorporated herein by reference.

FIELD OF THE DISCLOSURE

The present disclosure generally relates to an off-road vehicle. More particularly, the present disclosure relates to engine and transmission mounting of an off-road vehicle.

BACKGROUND

Vehicles can be divided based on their applications, such as on-road riding vehicles and off-road riding vehicles. Examples of on-road riding vehicles include motorbikes; sedan, hatchback, and wagon cars; sports utility vehicle (SUV) cars, and the like. Examples of off-road riding vehicles include recreational off-highway vehicles (ROV) such as ATVs and side-by-sides (UTVs, both utility and sport), enduro and motocross motorcycles, and the like. Because of the different applications, some of designs and structures of the on-road vehicles and off-road vehicles are different. For instance, space required by a vehicle is not as much of a constraint in an on-road vehicle. Hence, a frame structure of an on-road vehicle is generally larger/bigger as compared to an off-road vehicle. Also, due to high impact and forces generated by highly variable terrain, the frame structures of off-road vehicles might need to be stronger and more resilient.

As mentioned above, different types of off-road vehicles, such as UTVs and ATVs are widely used. Such off-road vehicles are used for adventure activities, such as hunting, trail riding, racing, or for performing heavy-duty work. Work might include transporting cargo, hauling equipment, towing loads, and the like. Side-by-side vehicles include seating for a driver and passenger in a side-by-side arrangement. Due to space constraints and performance concerns of a side-by-side vehicle, this side-by-side seating often pushes the engine to a tight space between the seating area and the rear axle. Such placement of the engine assembly towards the rear end of the vehicle provides desired balance to the vehicle while driving so as to limit excessive forward pitching of the vehicle and keep the vehicle stable through rough terrain at variable speeds. Apart from the stability, it is important to control Noise, Vibration, and Harshness (NVH) of a vehicle for providing a better riding experience.

To provide better stability and better distribution of NVH of the off-road vehicles, different modifications are being made while designing frame structures and engine assemblies of off-road vehicles.

SUMMARY OF THE DISCLOSURE

In some embodiments, the present disclosure sets forth a rear mount assembly in an off-road vehicle for securing an engine and transmission assembly to the vehicle frame. The rear mount assembly comprises a rear mount bracket defined by a rear central portion having a first side edge, a second side edge, and a supporting flange extending upwardly from each of the first side edge and the second side edge. The rear mount bracket is configured to be attached to a rear part of the engine assembly at the supporting flange thereof. The rear mount assembly also comprises a rear transverse bar defined by a first end, a second end, and a rear central part extending therebetween, the rear central part having at least a top surface. The rear transverse bar is configured to be attached to the rear central portion of the rear mount bracket at the top surface of the rear central part. Further, the rear mount assembly also comprises a pair of rear isolators configured to be attached to the rear transverse bar.

The present disclosure further includes an engine mount assembly for attaching an engine assembly to a frame, the engine assembly comprising a front part and a rear part. The frame comprises a front frame coupling and a rear frame coupling. The engine mount assembly comprises a front mount assembly for attaching the front part of the engine to the front frame coupling of the frame. The front mount assembly comprises a pair of front isolators. The engine mount assembly also comprises a rear mount assembly for attaching the rear part of the engine assembly to the rear frame coupling of the frame. The rear mount assembly comprises a rear mount bracket defined by a rear central portion having a first side edge, a second side edge, and a supporting flange extending from each of the first side edge and the second side edge. The rear mount bracket may be configured to be attached to the rear part of the engine assembly at the supporting flange thereof. The rear mount assembly further comprises a rear transverse bar defined by a first end, a second end, and a rear central part extending therebetween. The rear central part has a top surface such that the rear transverse bar is configured to be attached with the rear central portion of the rear mount bracket at the rear central part. The rear mount assembly also comprises a pair of rear isolators configured to be attached to the rear transverse bar.

In some embodiments, the present disclosure sets forth a method of installing an engine assembly in an off-road vehicle. The off-road vehicle comprises a frame extending in a longitudinal direction of the vehicle and defining a seating area and an engine area. The frame has a front mount assembly that comprises a pair of front isolators and a rear mount assembly that comprises a rear mount bracket having a rear central portion, a pair of supporting flanges, a rear transverse bar, and a pair of rear isolators. The aforesaid method comprises the steps of attaching a rear part of the engine assembly with the pair of supporting flanges of the rear mount bracket using at least one first fastener and attaching the rear transverse bar with the pair of rear isolators. The engine mount assembly is then guided towards the attached rear transverse bar such that a lower surface of the rear central portion abuts a top surface of the rear transverse bar. The rear mount bracket is then attached with the rear transverse bar using at least a second fastener.

In some embodiments, the present disclosure includes a frame for an off-road vehicle extending in a longitudinal direction of the vehicle and defining a seating area and an engine area. The frame comprises a frame structure facilitating the installation of an engine assembly from the seating area to the engine area. The frame structure comprises a first side portion defining a first side, a second side portion defining a second side, and a front central portion configured to be attached between the first side portion and the second side portion. The front central portion comprises a first member, a second member, and a cross member attached therebetween.

The present disclosure further sets forth an off-road vehicle comprising a frame extending in a longitudinal direction of the vehicle and defining a seating area and an engine area of the vehicle. The frame comprises a front frame structure, a first side structure, and a second side structure. In the said embodiment, the front frame structure facilitates the installation of an engine assembly from the seating area to the engine area and comprises a first side portion defining a first side thereof. The first side portion is configured to be attached to a first side member of the first side structure and a second side portion defining the second side thereof. The second side portion is configured to be attached to the second side structure. The front frame structure further comprises a front central portion configured to be removably attached to each of the first side portion and the second side portion. The front central portion comprises a first member, a second member, and a cross member attached therebetween, wherein the front central portion is positioned in a lateral direction of the vehicle and at least partially forward to the installed engine assembly.

The present disclosure includes a method for installing an engine assembly in an off-road vehicle. In the said embodiment, the off-road vehicle comprises a frame extending in a longitudinal direction of the vehicle and defining a seating area and an engine area. The frame has a front frame structure defined by a first side portion, a second side portion, and a removable front central portion therebetween. The method comprises the steps of receiving the engine assembly within the seating area and guiding the engine assembly to the engine area from the seating area. A rear part of the engine assembly is then attached with a rear mount assembly in the engine area and the removable front central portion is attached with the first side portion and the second side portion.

In some embodiments, the present disclosure includes an off-road vehicle comprising a frame extending in a longitudinal direction of the vehicle and defining a seating area and an engine area of the vehicle. The said frame further comprises a front frame structure, a first side structure, a second side structure, a front mount assembly, and a rear mount assembly. In the said embodiment, the front frame structure facilitates installation of an engine assembly from the seating area to the engine area. The said front frame structure comprises a first side portion configured to be attached to a first side member of the first side structure, a second side portion configured to be attached to the second side structure, and a front central portion configured to be removably attached to each of the first side portion and the second side portion. The frame as disclosed in the aforesaid embodiment also comprises a front mount assembly comprising a pair of front isolators and a rear mount assembly comprising a rear mount bracket, a rear transverse bar, and a pair of rear isolators, wherein the pair of rear isolators are positioned in parallel to the pair of front isolators.

The present disclosure further relates to a method of installing an engine assembly in an off-road vehicle. The off-road vehicle comprises a frame extending in a longitudinal direction of the vehicle and defining a seating area and an engine area. As per the embodiment, the frame has a front frame structure with a removable front central portion, a front engine mount assembly comprising a pair of front isolators, and a rear mount assembly. The method comprises the steps of receiving the engine assembly within the seating area and guiding the engine assembly to the engine area from the seating area. A rear part of the engine assembly is then attached with the rear mount assembly and a front part of the engine assembly is attached with the front mount assembly. The method further includes the steps of attaching the rear transverse bar with the pair of rear isolators using at least one second fastener and attaching the removable front central portion with the first side portion and the side second portion.

BRIEF DESCRIPTION OF THE DRAWINGS

A more complete understanding of the present disclosure may be derived by referring to the detailed description and claims when considered in connection with the Figures, wherein like reference numerals refer to similar elements throughout the Figures.

DETAILED DESCRIPTION

The following description is of exemplary embodiments of the invention only, and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms, and the like and still fall within the scope of the present invention.

Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Embodiments of the present disclosure describe an off-road vehicle having different features such as an engine assembly, a frame having a frame and a rear mount assembly facilitating easy installation of the engine assembly, a suspension assembly, a plurality of wheels, and a method of installing the engine assembly. The term 'engine assembly' used throughout the disclosure relates to an engine and a transaxle and/or transmission assembly of an off-road vehicle. In particular, the engine assembly, in accordance with the present disclosure, comprises an engine, a transaxle and/or a transmission, and associated parts known to a person skilled in the art. Components described herein are not limited to off-road vehicles and may be utilized for different vehicles. For example, the frame structure and the rear mount assembly may be used in different models on-road or off-road vehicles for quick and easy installation of the engine assembly. In addition, the frame and the rear mount assembly provide better distribution of load on the frame so as to provide better control of the vehicle while riding.

Figure 1:
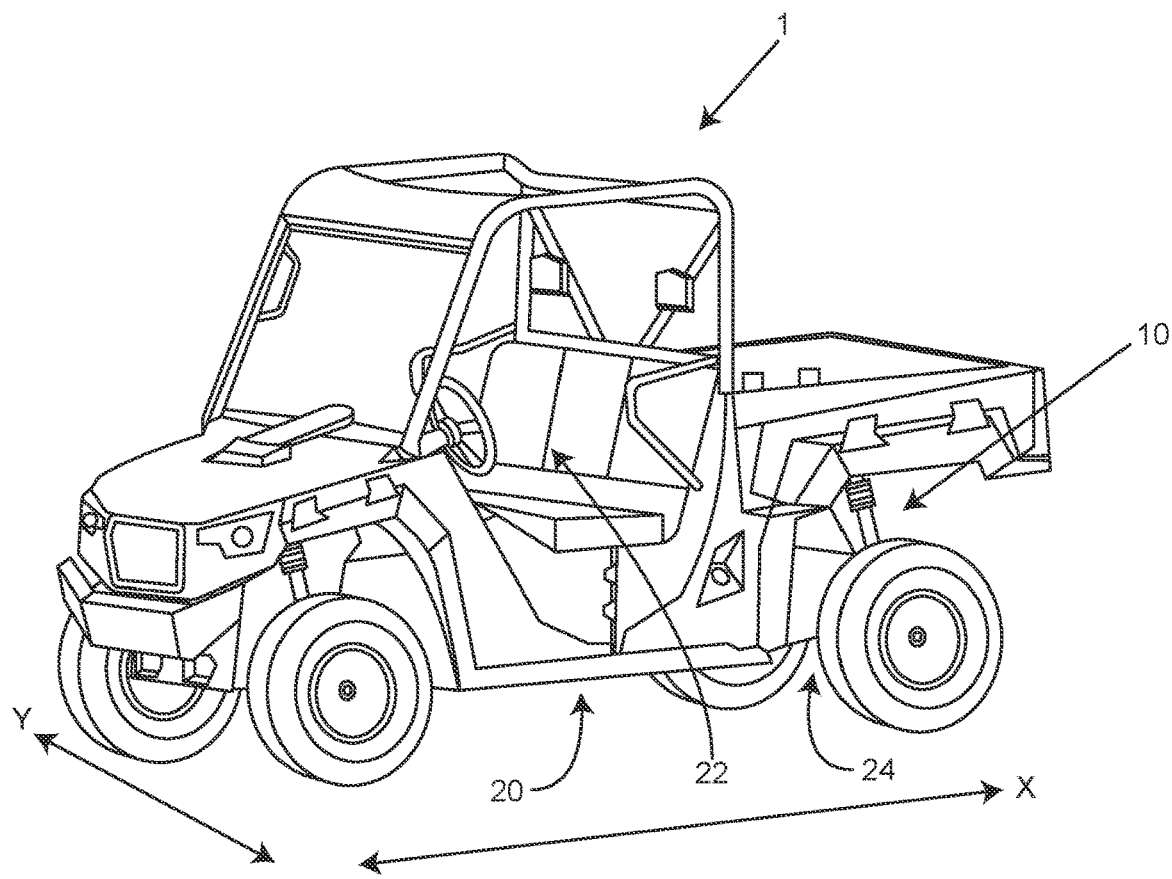
FIGS. 1-2 illustrate an exemplary side perspective view and side view of an off-road vehicle in accordance with the present disclosure.
Figure 2:
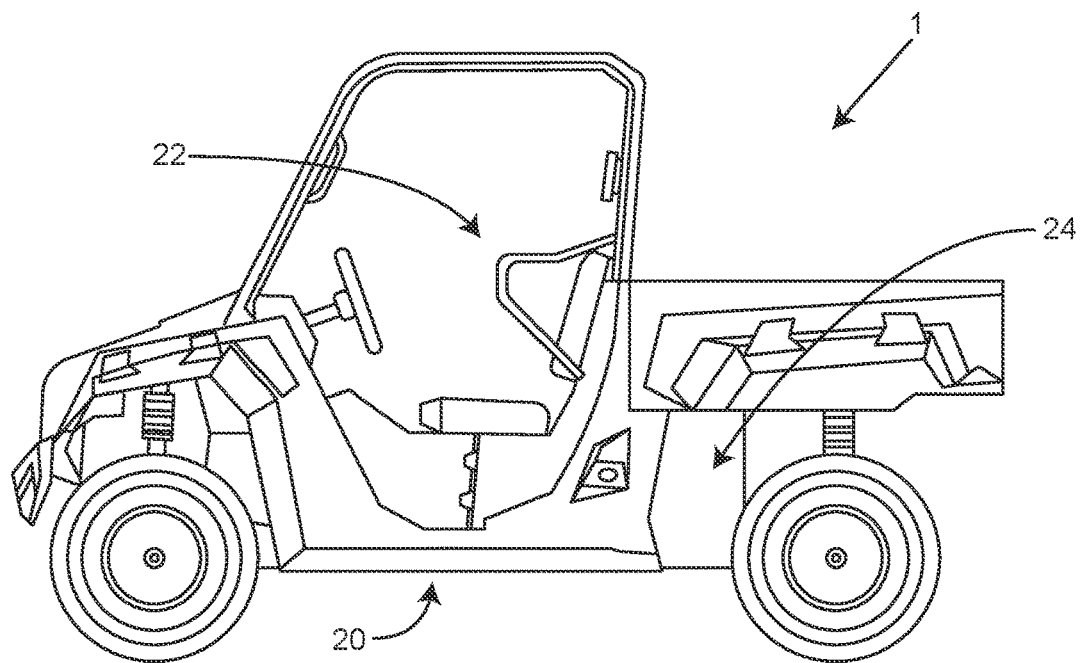
Figure 3:
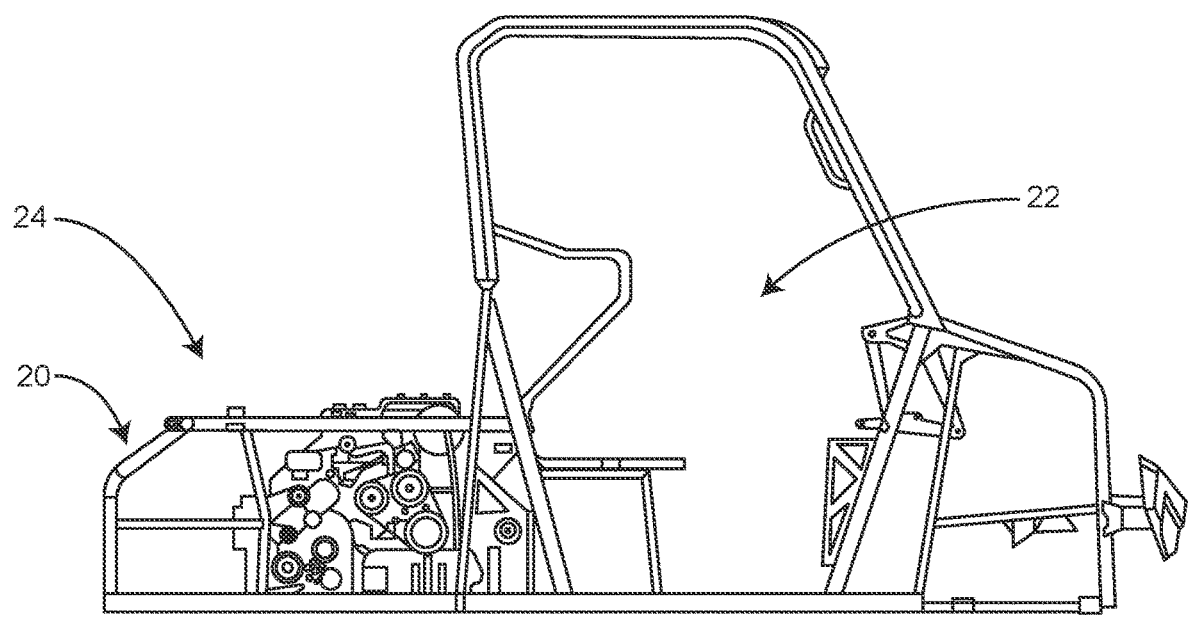
FIG. 3 illustrates an exemplary side-elevational view of a frame structure of an off-road vehicle in accordance with the present disclosure.

Reference is now made to FIGS. 1-2, which represent an off-road vehicle 1 according to some embodiments of the present disclosure. The vehicle 1 generally comprises a frame 20 and an engine assembly 10. The frame 20 is configured to provide support to the engine assembly 10 and other components of the vehicle 1. The frame 20 is configured to be divided into two parts. A front part of the frame 20 defines a seating area 22. The seating area 22 of the vehicle 1 comprises a steering assembly of the vehicle 1, corresponding components, and one or more seats for providing seating arrangement to one or more riders. In some embodiments, the front part of the frame 20 may include one or more suspension assemblies for front wheels of the vehicle 1. A rear part of the frame 20 defines an engine area 24. The engine area 24 is configured to receive the engine assembly 10 of the vehicle 1. In some embodiments, the rear part of the frame 20 may include one or more suspension assemblies for rear wheels of the vehicle 1. FIG. 3 illustrates an exemplary frame 20 in accordance with the present disclosure.

In some embodiments, the vehicle 1 extends in a longitudinal direction and a lateral direction. A longitudinal direction of the vehicle 1 is defined by a direction extending between a front of a seating area 22 to a back of the engine area 24 and is indicated by X. A lateral direction of the vehicle 1 is defined by a direction generally transverse to the longitudinal direction X and is indicated by Y.

Figure 4:
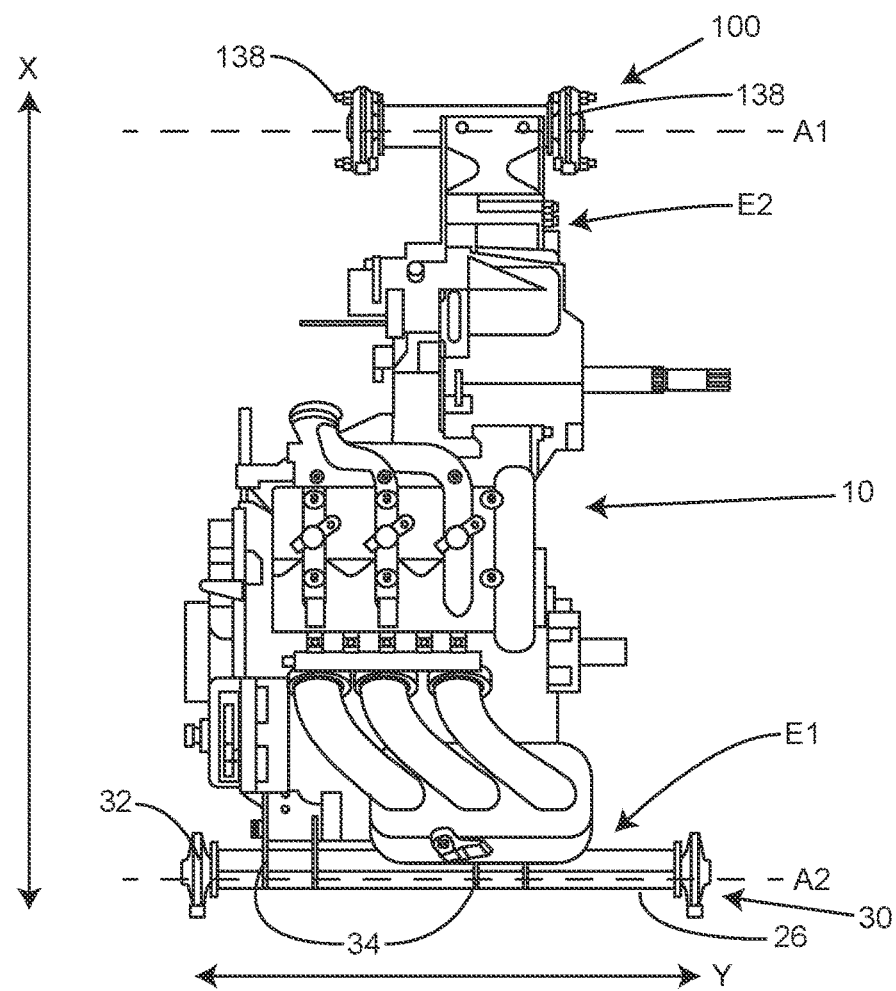
FIG. 4 illustrates an exemplary top view of an engine and transmission assembly of an off-road vehicle in accordance with the present disclosure.

The engine assembly 10, preferably including an engine and transmission, may comprise a front part E1 and a rear part E2 (seen e.g., in FIG. 4). The front part E1 of the engine assembly 10 may be configured to be attached to the frame 20 using a front mount assembly 30. The rear part E2 of the engine assembly 10 may be configured to be attached to the frame 20 using a rear mount assembly 100.

In some embodiments, the front mount assembly 30 may comprise a front horizontal bar 26, a pair of front isolators 32, and one or more front brackets 34. The front horizontal bar 26 may be configured to be attached to the front part E1 of the engine assembly 10 using the one or more front brackets 34. The pair of front isolators 32 may be configured to be attached to sides of the front horizontal bar 26 for attachment of the front part E1 of the engine assembly 10 with the frame 20. Such attachment of the front part E1 of the engine assembly 10 provides secure attachment of the engine assembly 10 to the frame 20 such that a movement of the front part E1 of the engine assembly 10 in the longitudinal and lateral direction Y is completely restricted, other than by some flex of the frame members and slight movement within the isolators.

Figure 5:
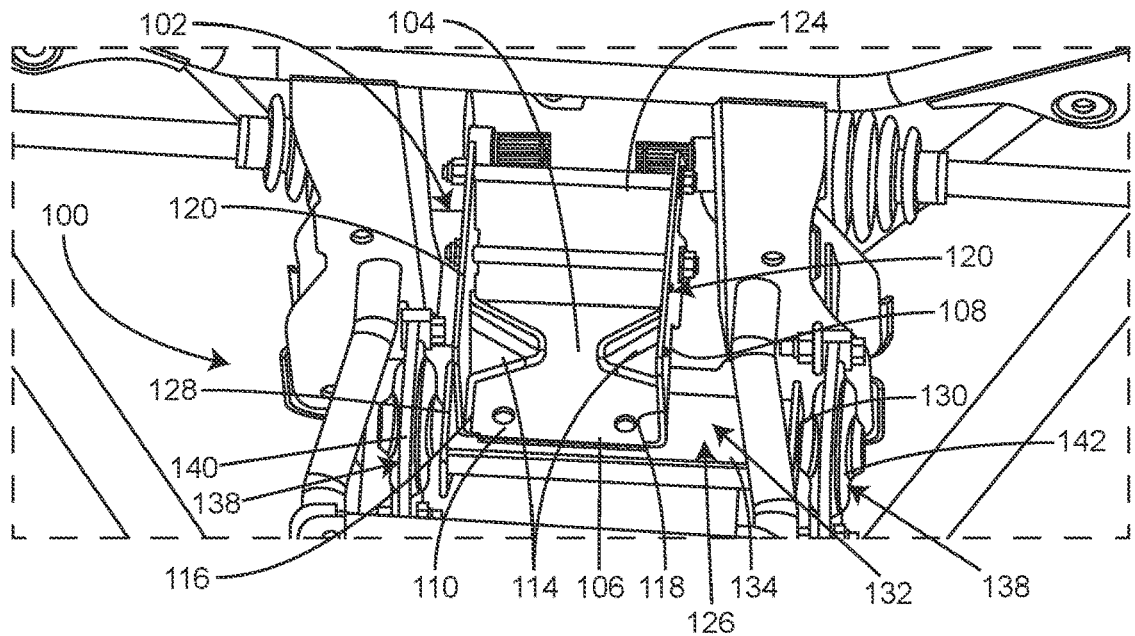
FIGS. 5-6 illustrate an exemplary rear mount assembly according to an embodiment of the present disclosure.
Figure 6:
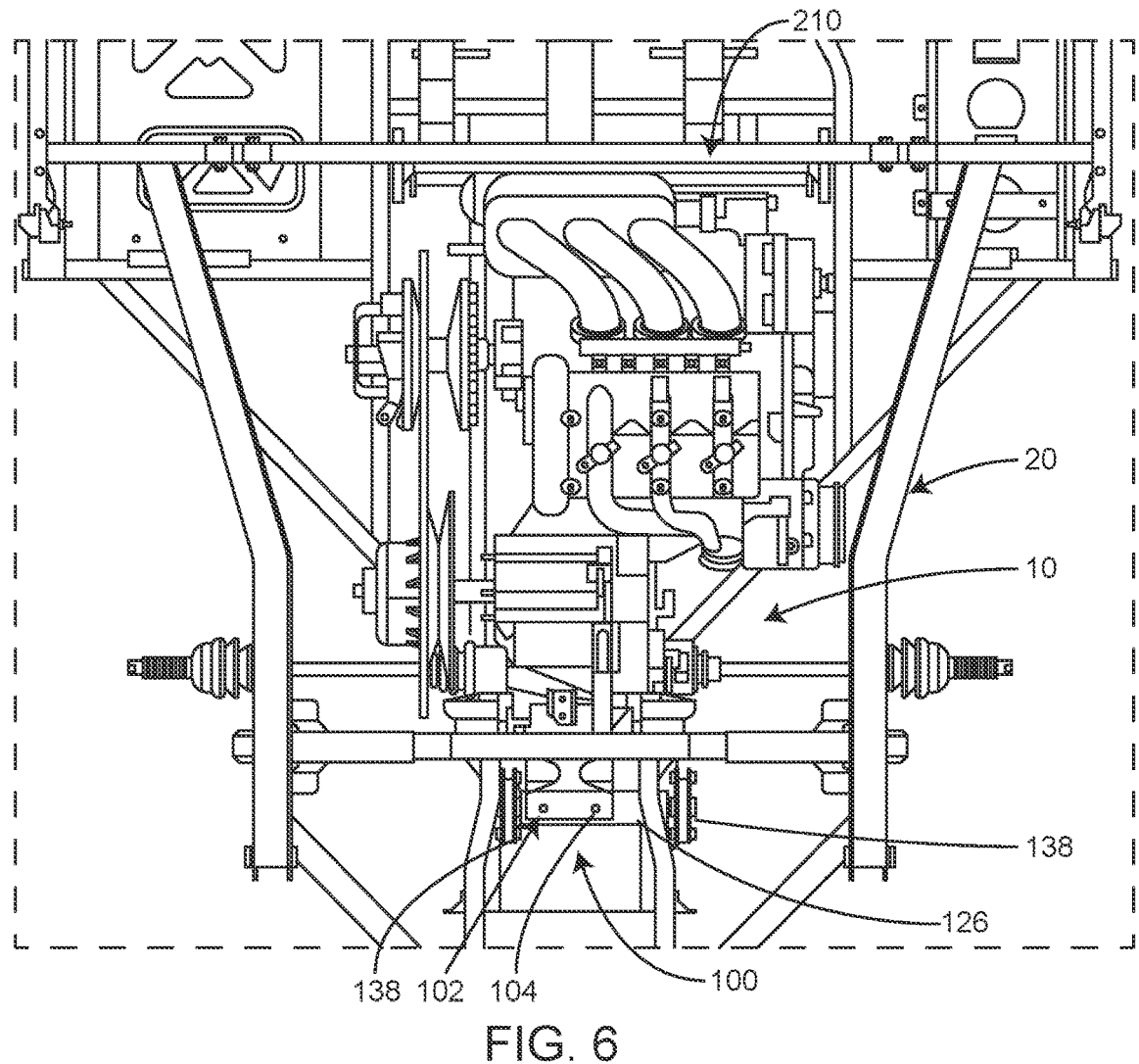

The rear mount assembly 100 may comprise a rear mount bracket 102 (seen e.g., in FIGS. 5-6). The rear mount bracket 102 may be configured to be connected to the rear part E2 of the engine assembly 10. In an embodiment, a shape of the rear mount bracket 102 is designed so as to receive the rear part E2 of the engine assembly 10 therewithin. The rear mount bracket 102 may be defined by a rear central portion 104 having a first side edge 116, a second side edge 118, and a supporting flange 120 extending upwardly from each of the first side edge 116 and the second side edge 118. Accordingly, the rear mount bracket 102 may comprise a first supporting flange at the first side edge 116 and a second supporting flange at the second side edge 118, and the rear central portion 104 collectively comprises a pair of supporting flanges. In some embodiments, an angle of the supporting flange 120 with respect to the rear central portion 104 may be a right angle. In other embodiments, the angle may be an acute angle or an obtuse angle with respect to the rear central portion 104. In other words, the supporting flanges 120 may be angled corresponding to a shape of the rear part E2 of the engine assembly 10. In an embodiment, the rear central portion 104 may have a rectangular shape. In another embodiment, the rear central portion 104 may be of a square shape.

For accommodating/receiving the rear part E2 of the engine assembly 10, the supporting flange 120 may comprise at least one first hole (not seen) to receive at least one first fastener 124 (seen e.g., in FIG. 5). In some embodiments, the rear part E2 of the engine assembly 10 may comprise corresponding one or more holes to receive the one or more first fasteners for attachment with the rear mount bracket 102. Accordingly, the first fastener may be configured to attach the rear mount bracket 102 from the first supporting flange 120 to the second supporting flange 120 using the one or more first fasteners. In a preferred embodiment, each supporting flange 120 comprises two first holes to receive two first fasteners. The one or more first fasteners may be positioned in the lateral direction Y of the vehicle 1 when the rear mount bracket 102 is attached to engine assembly 10.

The rear central portion 104 may further include an upper surface 106 and a lower surface 108 (seen e.g., in FIG. 5). The upper surface 106 may be gusseted with an elevated triangular section 114 extending from therefrom towards each supporting flange 120. In other words, the upper surface 106 may comprise two elevated triangular sections extending therefrom, one extending towards the first supporting flange 120 and another extending towards the second supporting flange 120. The elevated triangular sections may be configured to provide a lateral strength to the rear bracket mount to receive the rear part E2 of the engine assembly 10 therewithin. In some embodiments, the elevated triangular sections 114 may be stamped on the rear bracket mount 102 at the time of manufacturing. In such embodiments, a corresponding portion of the lower surface 108 may form a corresponding cavity C (seen e.g., in FIG. 16). The rear central portion 104 may further comprise at least one second hole 110 extending from the upper surface 106 to the lower surface 108. The at least one second hole 110 may be configured to receive corresponding at least one second fastener.

The rear mount assembly 100 may further comprise a rear transverse bar 126 (seen e.g., in FIGS. 5-6). The rear transverse bar 126 may be defined by a first end 128, a second end 130, and a rear central part 132 therebetween. The rear central part 132 may be defined by a top surface 134. The rear transverse bar 126 may comprise one or more holes corresponding to the at least one second hole 110 of the rear central part 132 of the rear mount bracket 102. The one or more holes of the rear central part 132 may be configured to receive the at least one second fastener when the rear mount bracket 102 is attached to the rear transverse bar 126. In an embodiment, when attached, the top surface 134 of the rear central part 132 of the rear transverse bar 126 is configured to abut the lower surface 108 of the rear central portion 104 of the rear mount bracket 102. The rear transverse bar 126 may be configured to be oriented in the lateral direction Y of vehicle 1 when attached. In an exemplary embodiment, the rear transverse bar 126 may have a rectangular cross-section.

The rear mount assembly 100 may further comprise a pair of rear isolators 138 (seen e.g., in FIGS. 5-6). The pair of rear isolators 138 may be configured to be attached to the rear transverse bar 126. In an embodiment, a first rear isolator 140 may be attached to the first end 128 of the rear transverse bar 126 and a second rear isolator 142 may be attached to the second end 130 of the rear transverse bar 126. The pair of rear isolators 138 may be attached to the rear transverse bar 126 using one or more rear fasteners. The attachment of the rear part E2 of the engine assembly 10 (seen e.g., in FIG. 4) with the rear mount assembly 100 (seen e.g., in FIG. 5) ensures secure connection of the rear part E2 of the engine so as to restrict movement of the engine assembly 10 while the vehicle is in use. Such secure attachment reduces noise, vibration, and harshness (NVH) in the vehicle 1, thereby providing a smooth riding experience.

The rear isolators 138, when attached, are positioned so as to be in parallel with each other and with the pair of front isolators 32. In other words, each of the pair of rear isolators 138 and the pair of front isolators 32 is positioned in a same configuration. Particularly, a front central axis A1 passing through centres of the pair of front isolators 32 is parallel to a rear central axis A2 passing through centres of the pair of rear isolators 138 (seen e.g., in FIG. 4). More particularly, as the pair of rear isolators 138 are positioned parallel to each other, the centres of the pair of rear isolators 138 lie on a same central axis, defining the rear central axis A2. Such positioning of the pair of rear isolators 138 results in a less space required at the rear part E2 of the engine assembly 10 for attachment, thereby reducing an overall space envelop required when the engine assembly 10 is installed in the engine area 24. Further, the reduced space envelop may facilitate more space for other parts of the vehicle 1, for instance, a larger engine assembly 10 or a better suspension assembly.

Figure 7:
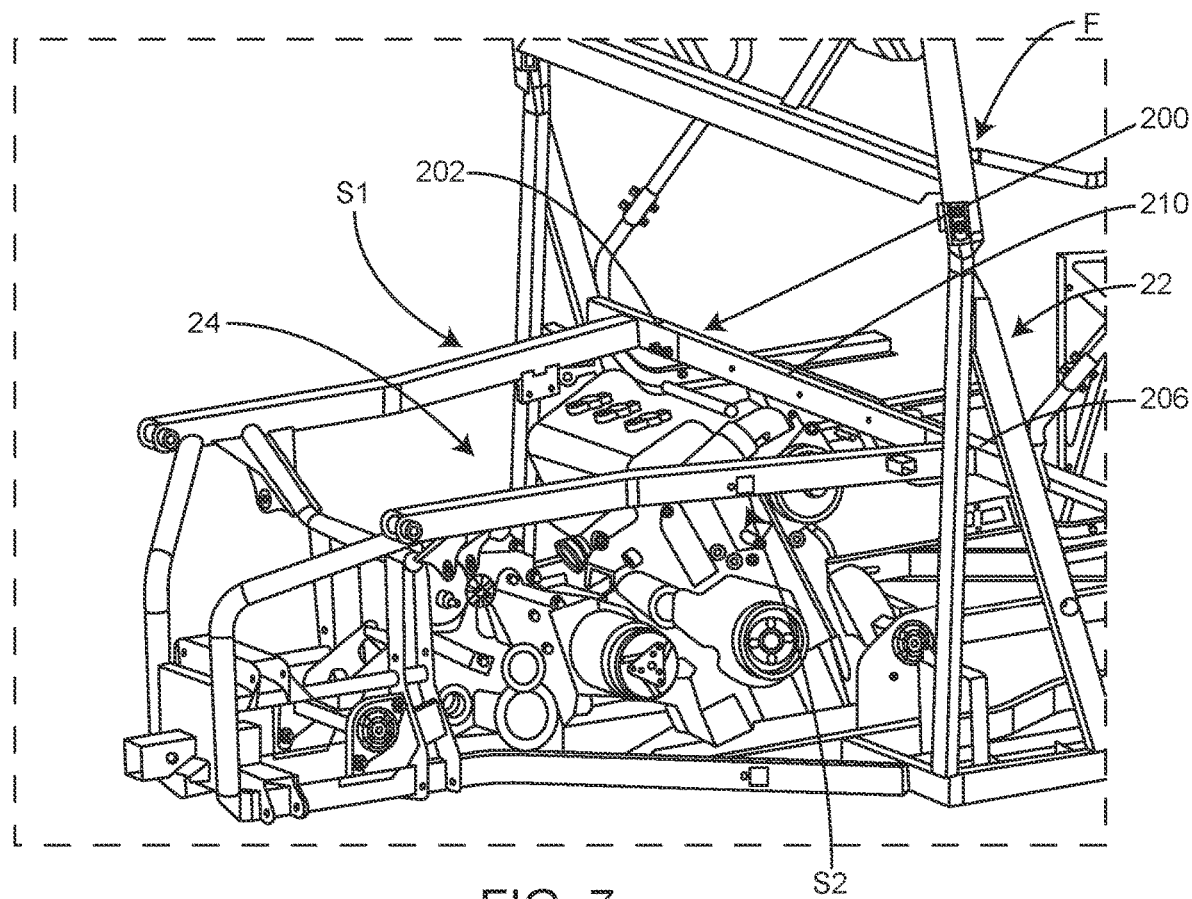
FIG. 7 illustrates an exemplary engine assembly installed using a rear mount assembly according to an embodiment of the present disclosure.

The present disclosure further sets forth a frame structure F of a frame 20 of an off-road vehicle 1 (seen e.g., in FIG. 7). The frame structure may be defined by a front frame structure 200, a first side structure S1, and a second side structure S2. In some embodiments, the front frame structure 200 may be configured to facilitate installation of the engine assembly 10 within the engine area 24. The front frame structure 200 may comprise a first side portion 202 defining a first side the frame and a second side portion 206 defining a second side of the frame. The first side portion 202 and the second side portion 206 may be configured to be attached to any one of the first side structure S1 and the second side structure S2. For instance, in an exemplary embodiment, the first side portion 202 may be attached to the first side structure and the second side portion 206 may be attached to the second side structure. The first side portion 202 and the second side portion 206 may be attached with the first side structure and the second side structure, respectively, using one or more fastening mechanism or may be welded together for attachment.

Figure 8:
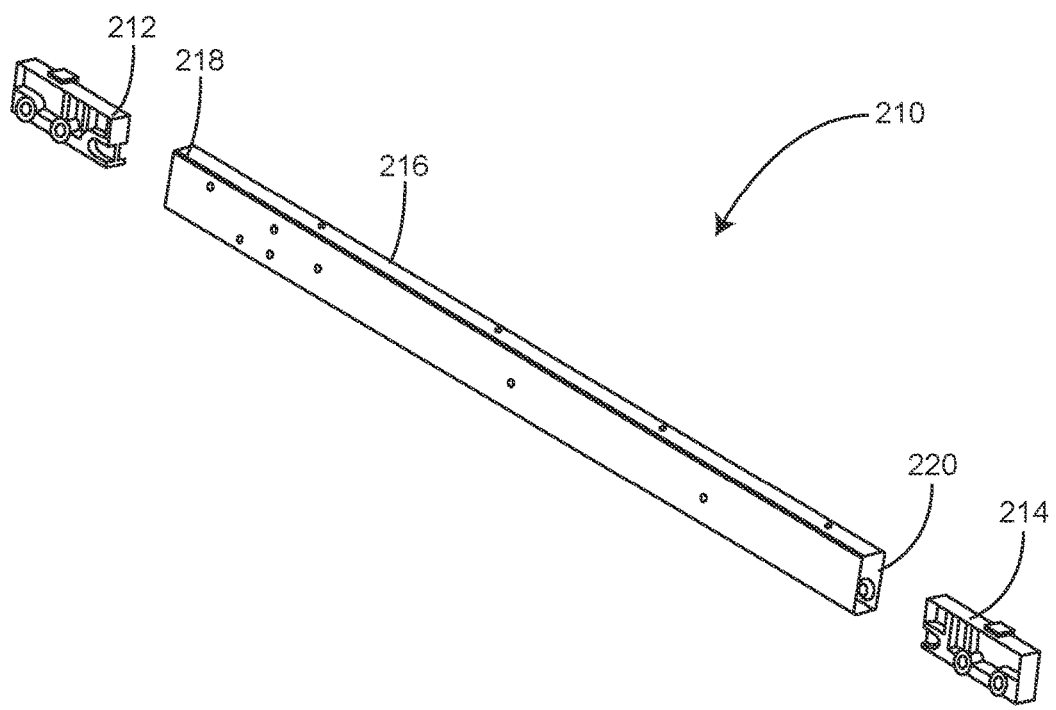
FIG. 8 illustrates an exemplary isometric view of a removable frame member of an off-road vehicle according to an embodiment of the present disclosure.
Figure 9:
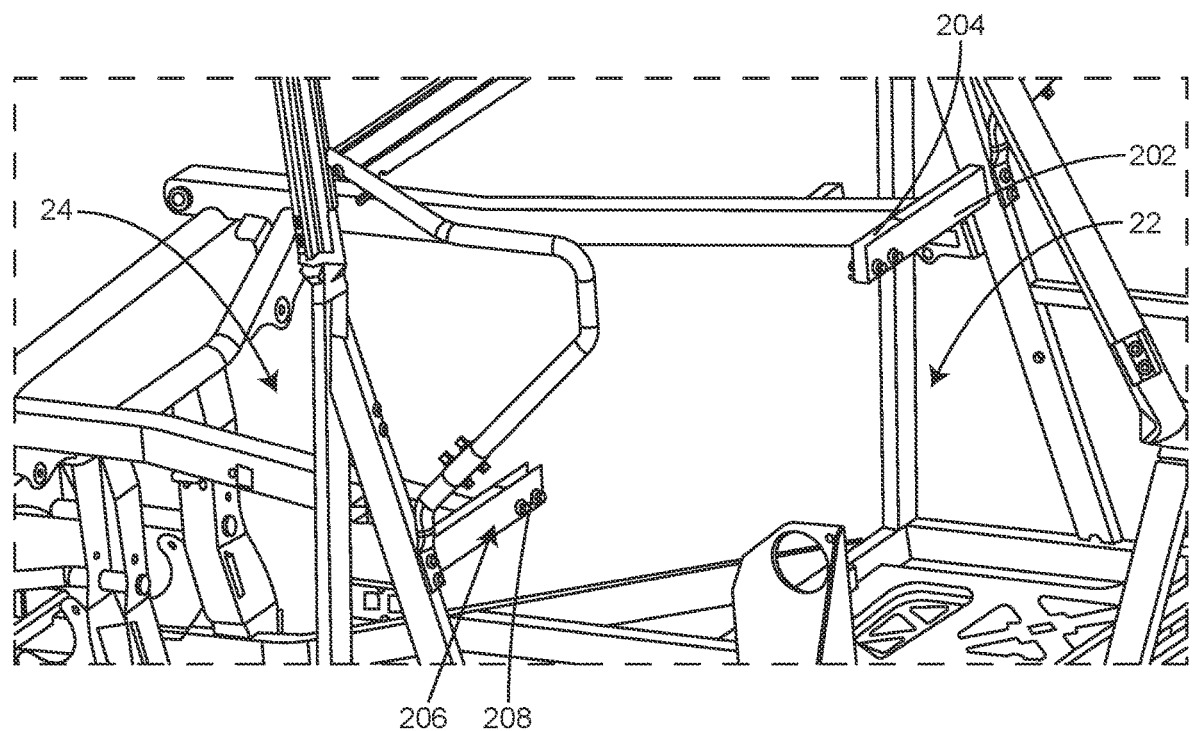
FIG. 9 illustrates an exemplary frame structure of an off-road vehicle with a removable frame member removed according to an embodiment of the present disclosure.
Figure 10:
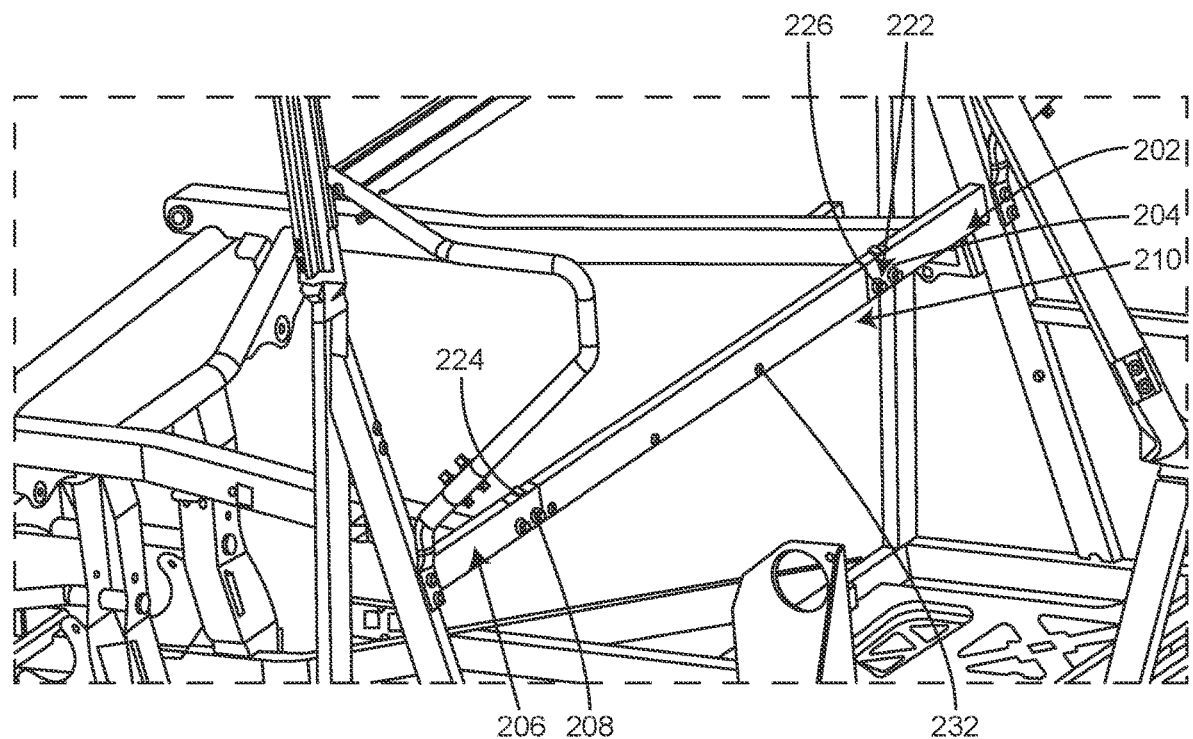
FIGS. 10-11 illustrate an exemplary frame structure with a secured removable frame member therewith according to an embodiment of the present disclosure.
Figure 11:
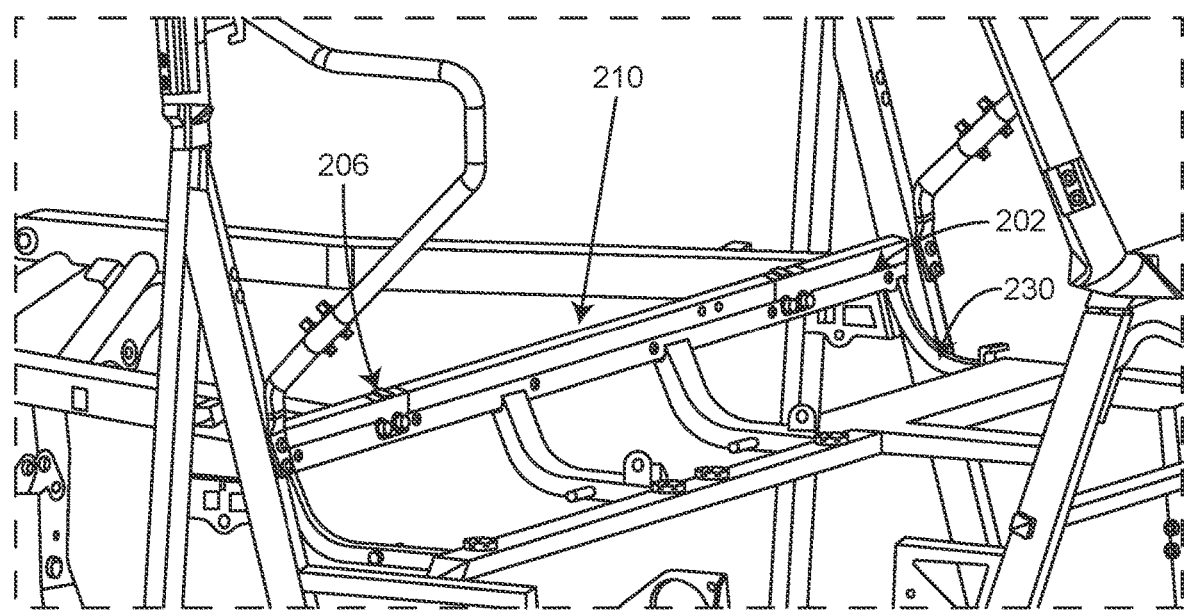

In some embodiments, the front frame structure 200 may further comprise a front central portion 210 (seen e.g., in FIGS. 8, 10-11). The front central portion 210 may be removably attached to the first side portion 202 and the second side portion 206. In an embodiment, the first side portion 202, the cross member 216, and the second side portion 206 may be attached in a sequential manner. Particularly, the front central portion 210 comprises a proximal end 222 configured to be attached to the first side portion 202 and a distal end 224 configured to be attached to the second side portion 206 (seen e.g., in FIG. 10). More particularly, the proximal end 222 of the front central portion 210 may be received within a first bracket 204 of the first side portion 202 and the distal end 224 of the front central portion 210 may be received within a second bracket 208 of the second side portion 206 (seen e.g., in FIGS. 9-10). The front central portion 210 may be attached to the first side portion 202 and the second side portion 206 using at least one third fastener 226. Such arrangement makes the front central portion 210 easily removable from the frame 20, which facilitates easy installation of the engine assembly 10 in the engine area 24. Further, the front central portion 210 may be easily attached to the frame 20 after installation of the engine assembly 10. Thereby, making the attachment of the front central portion 210 quick and easy.

The front central portion 210 may comprise a first member 212, a second member 214, and a cross member 216 attached therebetween (seen e.g., in FIG. 8). The first member 212 may be attached to the first side portion 202 and the second member 214 may be attached to the second side portion 206. Particularly, the first member 212 may be received within the first bracket 204 of the first side portion 202 and the second member 214 may be received within the second bracket 208 of the second side portion 206.

In some embodiments, the cross member 216 may be defined by a first member end 218 configured to be attached to the first member 212 and a second member end 220 configured to be attached to the second member 214 (seen e.g., in FIG. 8). In some embodiments, the cross member 216 may be attached to the first member 212 and the second member 214 by welding. In other embodiments, the cross member 216 may be attached to the first member 212 and the second member 214 by other fastening mechanism, such as by one or more fasteners, a snap fit mechanism, or the like.

In an embodiment, the front frame structure 200 may be attached to the first side portion 202 and the second side portion 206 after installation of the engine assembly 10 in the engine area 24. In a preferred embodiment, the front frame structure 200 may be positioned at least partially forward of the installed engine assembly 10 (seen e.g., in FIG. 6). The front frame structure 200 may further be positioned in the lateral direction Y of the vehicle 1 when attached in the first side portion 202 and the second side portion 206. Such arrangement ensures an additional space at a top part of the engine assembly 10, thereby providing simple arrangement/placement of the engine assembly 10 with respect to the frame 20. In an embodiment, the front frame structure 200 may be made of a metal, specifically steel, and may have a rectangular cross-section.

The front central portion 210 may comprise a front surface and a back surface (seen e.g., in FIGS. 10-11). In an embodiment, the front surface may be configured to attach a seat frame 230 therewith. The front surface may be attached with the seat frame 230 using one or more fourth fasteners. In a preferred embodiment, the seat frame 230 may be attached with the front surface using four fourth fasteners.

The present disclosure further relates to a method of installing an engine assembly 10 in an off-road riding vehicle 1. It is to be noted that the term 'engine assembly 10' relates to an engine and a transaxle and/or transmission assembly of an off-road vehicle 1. The engine assembly 10 may comprise a front part E1 and a rear part E2. In a preferred embodiment, a front part of an engine constitutes the front part E1 of the engine assembly 10 and a rear part of a transaxle constitutes the rear part E2 of the engine assembly 10. The engine assembly 10 may be configured to be attached to a vehicle 1 using a front mount assembly 30 at the front part E1 and a rear mount assembly 100 at the rear part E2. The front mount assembly 30 may comprise a front horizontal bar and a pair of front isolators 32.

The rear mount assembly 100 may comprise a rear mount bracket 102, a rear transverse bar 126, and a pair of rear isolators 138. The rear mount bracket 102 may comprise a rear mount bracket 102 having a first side edge 116, a second side edge 118, a supporting flange 120 extending upwardly from each of the first side edge 116, and the second side edge 118, an upper surface 106, a lower surface 108, and at least one first hole configured to receive at least one first fastener 124. The rear transverse bar 126 may comprise a top surface 134, at least one second hole 110 configured to receive at least one second fastener.

In an embodiment, the pair of front isolators 32 and the pair of rear isolators 138 may be positioned in parallel to each other. In other words, each isolator of the pair of front isolators 32 and the pair of rear isolators 138 may be configured to be positioned in a same orientation such that a centre of each isolator may lie on an axis parallel to the longitudinal axis of the vehicle 1.

The vehicle 1 may be configured to extend in a longitudinal direction X. It is further to be noted that the off-road vehicle 1 may be a side-by-side vehicle 1 as described hereinabove, and all the features of the vehicle 1 as described hereinabove are included in the method of installing the engine assembly 10. Accordingly, the vehicle 1 comprises a frame 20 defining a seating area 22 and an engine area 24, and may comprise a front frame structure 200, a first side structure, and a second side structure. The front frame structure 200 may comprise a first side portion 202, a second side portion 206, and a removable front central portion 210 configured to be attached therebetween. According to a preferred embodiment, the frame 20 facilitates the installation of the engine assembly 10 either from the seating area 22 to the engine area 24 or directly to the engine area 24.

Figure 12A:
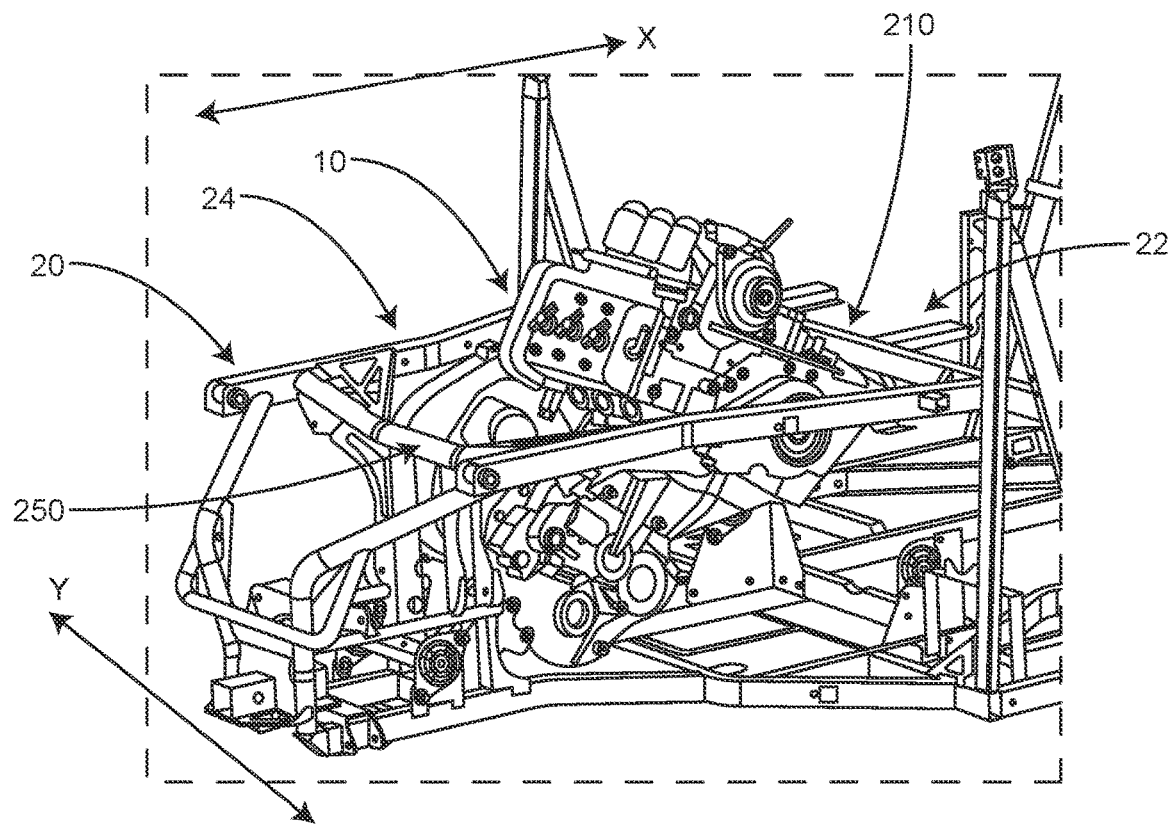
FIGS. 12A-12B illustrate exemplary methods of installing an engine assembly in an off-road vehicle according to embodiments of the present disclosure.
Figure 12B:
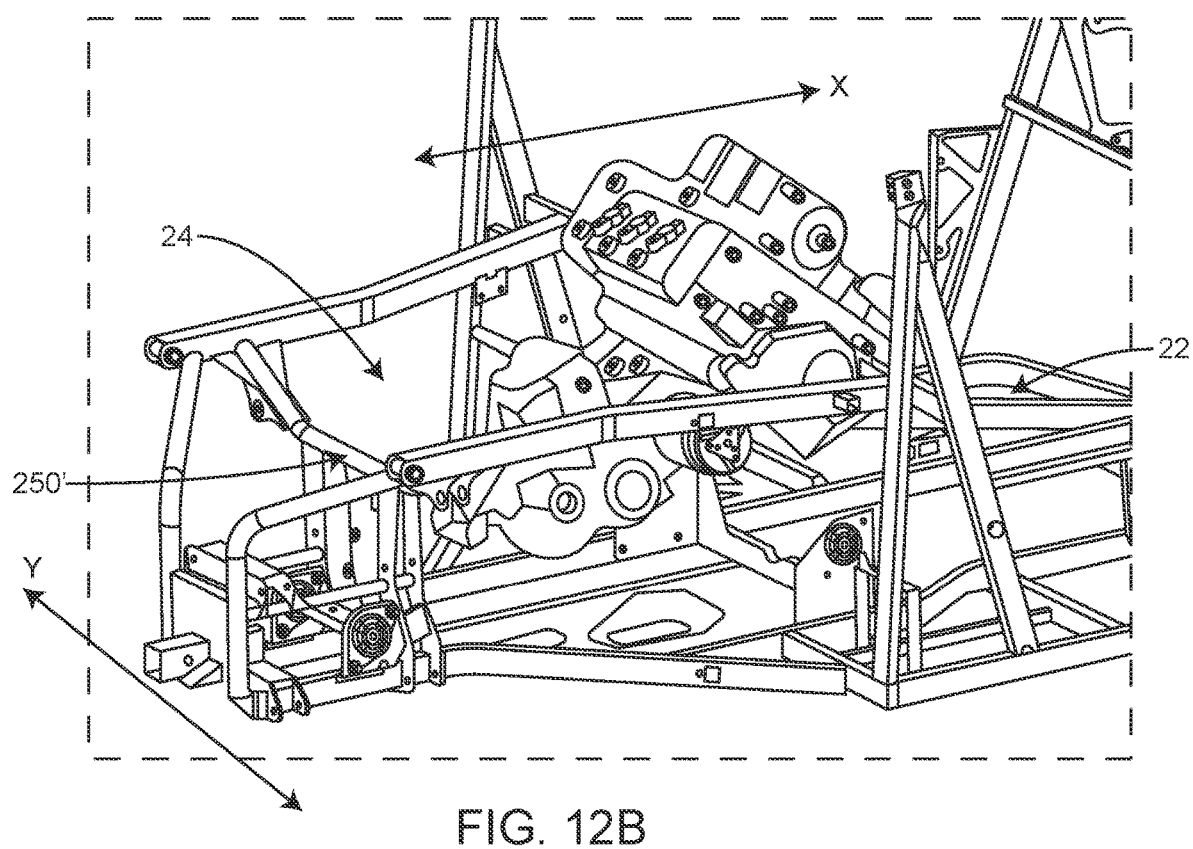
Figure 13:
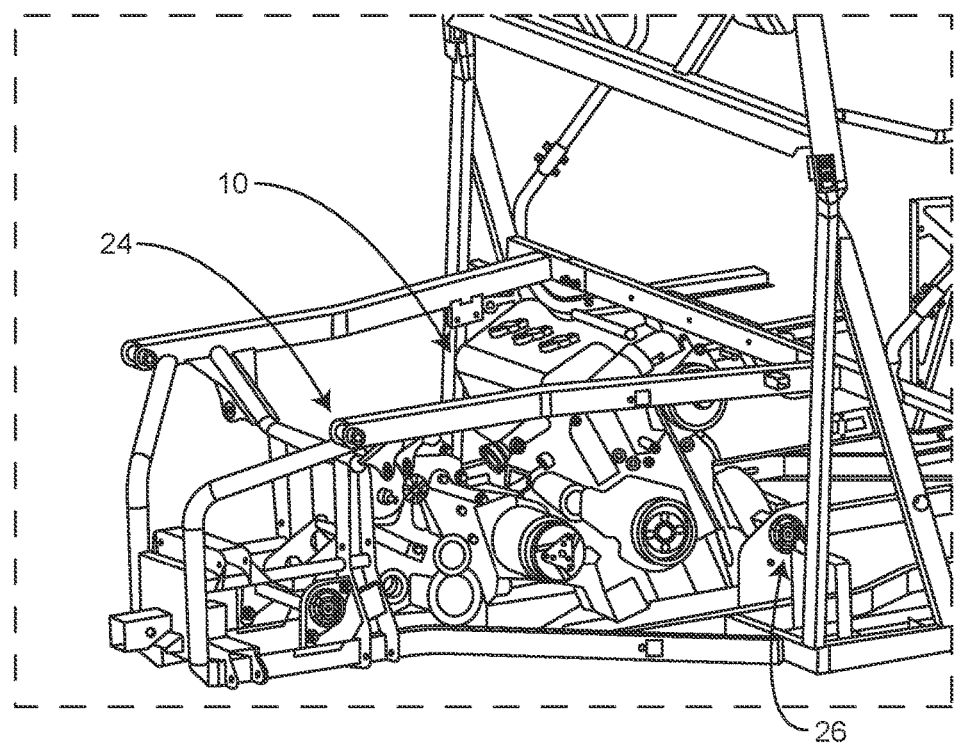
FIG. 13 illustrates an exemplary installed engine assembly of an off-road vehicle in accordance with the present disclosure.

The method of installing the engine assembly 10 in the engine area 24 comprises the step of attaching the rear part E2 of the engine assembly 10, more specifically the rear part of the transaxle, with the rear mount bracket 102 and the rear transverse bar 126 with the pair of rear isolators 138. It is to be noted that the step of attaching of the rear part E2 of the engine and the rear transverse bar 126 may be performed together or sequentially in any order without departing from the scope of the present disclosure. The engine assembly 10 is then received in the engine area 24. In an embodiment, the engine assembly 10 may be directly received in the engine area 24 (seen e.g., in FIG. 12A). In such embodiment, the engine assembly 10 may be attached to the rear mount assembly 100 and the front mount assembly 30 after receiving the engine assembly 10 in the engine area 24. In another embodiment, the engine assembly 10 may be received in the seating area 22 and may be guided to the engine area 24 (seen e.g., in FIG. 12B). In such embodiment, the method further includes the step of guiding the engine assembly 10, attached with the rear mount bracket 102, towards the rear transverse bar 126, attached to the pair of rear isolators 138. In an embodiment, the engine assembly 10, with the rear mount bracket 102 attached to the rear part E2 thereof, may be moved towards the rear transverse bar 126 at least at an angle. As the rear mount bracket 102 and the rear transverse bar 126 are already attached with the rear part E2 of the engine assembly 10 and the pair of rear isolators 138, respectively, the installation of the engine assembly 10 requires the step of fastening of the at least one second fastener for securement between the rear mount bracket 102 and the horizontal bar 126. The rear mount bracket 102 is attached with the rear transverse bar 126 using the at least second fastener, such that the lower surface 108 of the rear central portion 104 of the rear mount bracket 102 abuts the top surface 134 of the rear transverse bar 126, thereby making installation of the engine assembly 10 easy and quick. Once the rear mount bracket 102 is attached with the rear transverse bar 126, the removable front central portion 210 is attached to the first side portion 202 and the second side portion 206. FIG. 13 illustrates the engine assembly 10 installed in the engine area 24 in accordance with any of the embodiments discussed above. The removable front central portion 210 is configured to be positioned in a lateral direction Y of the vehicle 1, transverse to the longitudinal direction X. In such position, the removable front central portion 210 is at least partially forward of the installed engine assembly 10.

Figure 14A:
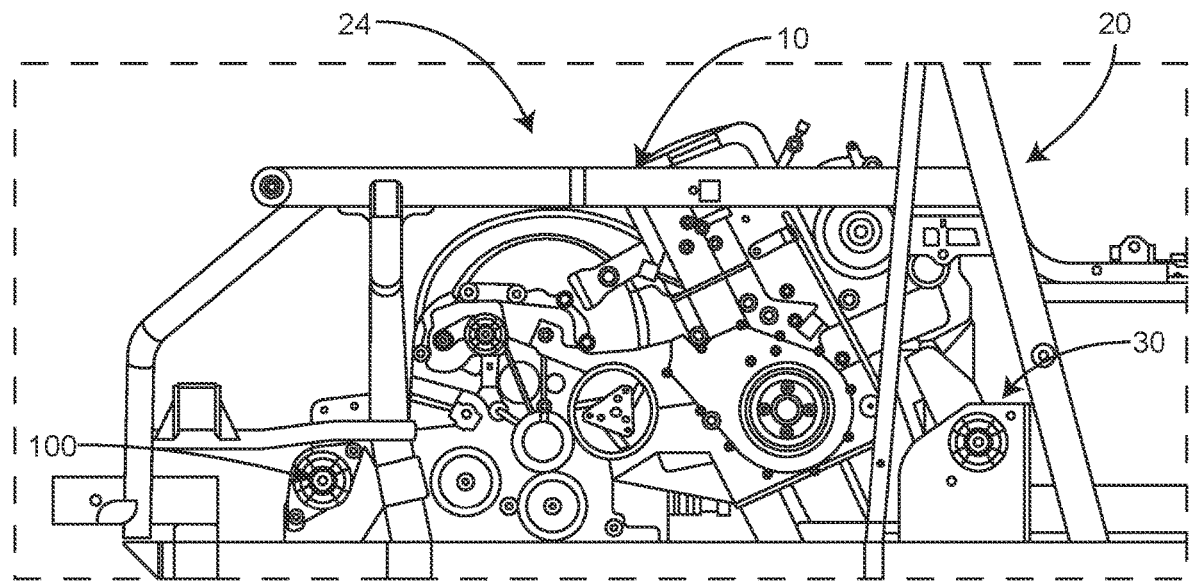
FIGS. 14A-14B illustrate exemplary views from a first side of an installed engine assembly within a frame of an off-road vehicle in accordance with the present disclosure.
Figure 14B:
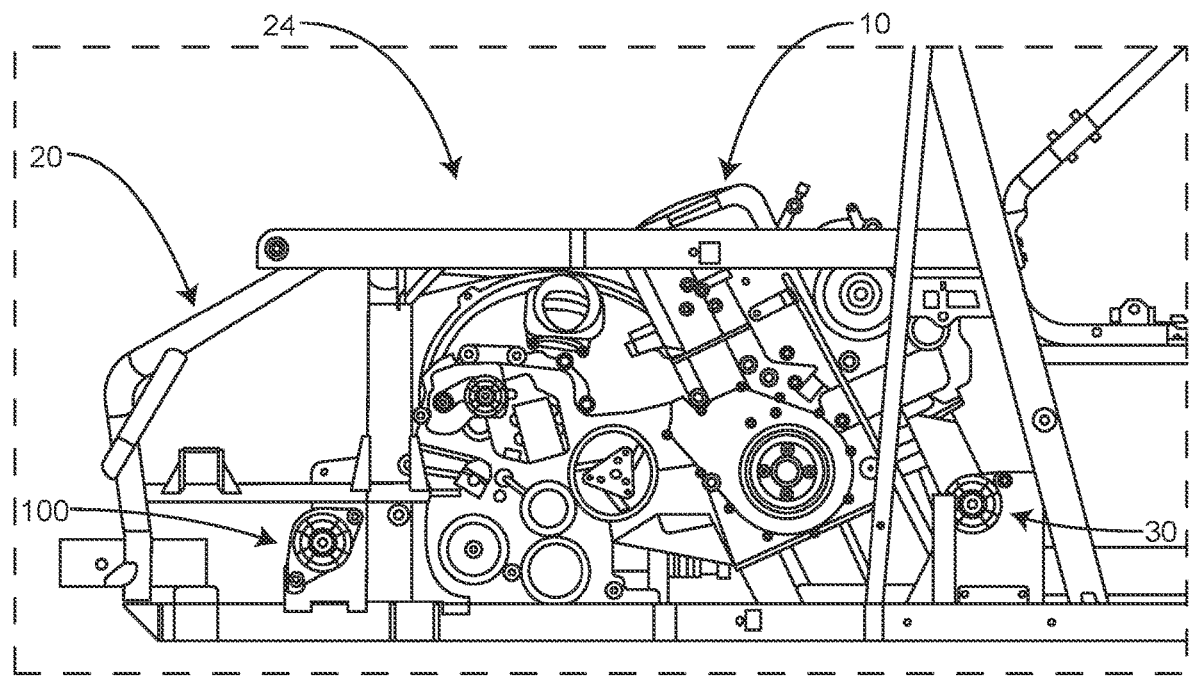
Figure 15A:
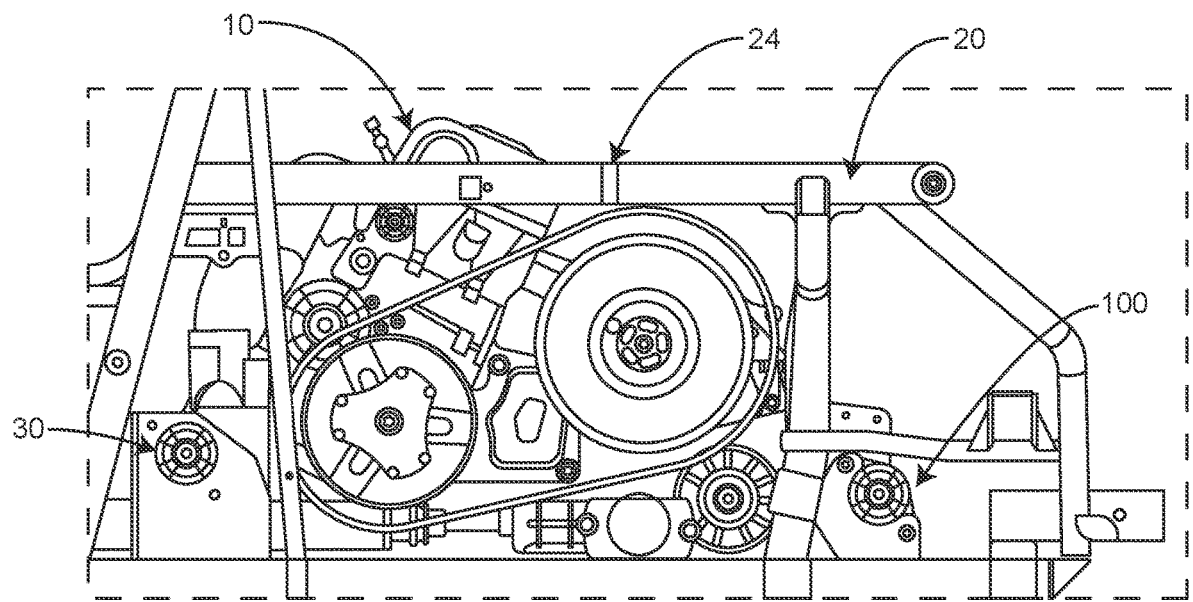
FIGS. 15A-15B illustrate exemplary views from a second side of an installed engine assembly within a frame of an off-road vehicle in accordance with the present disclosure.
Figure 15B:
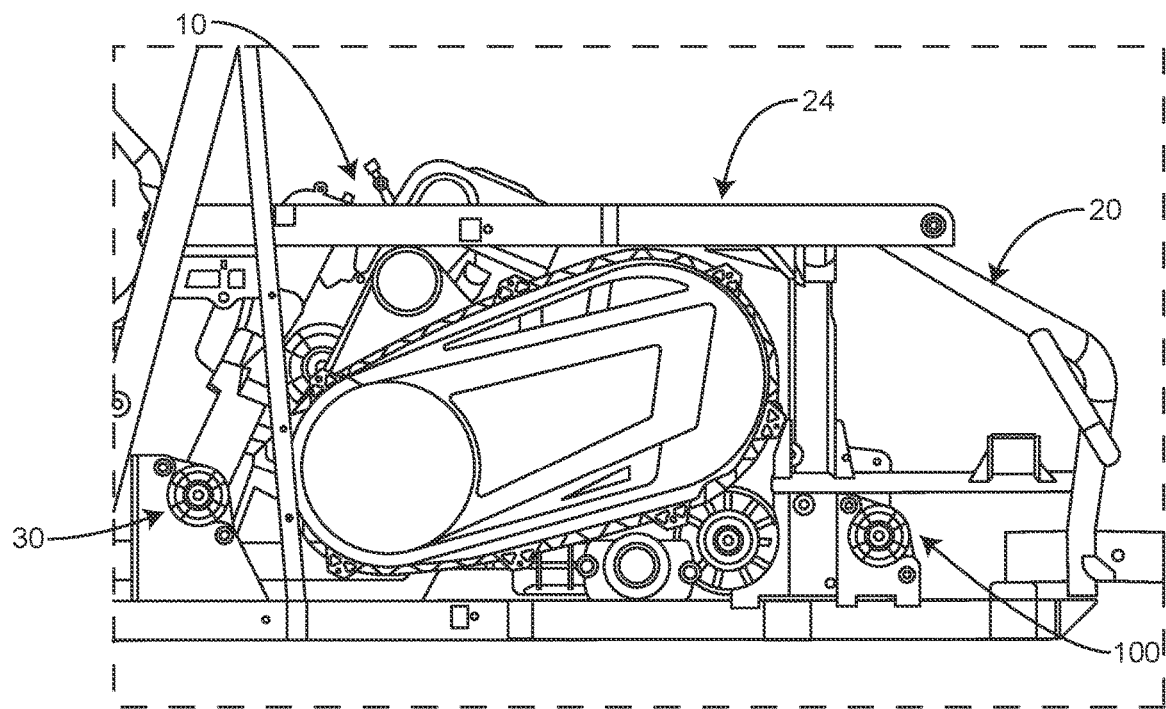
Figure 16A:
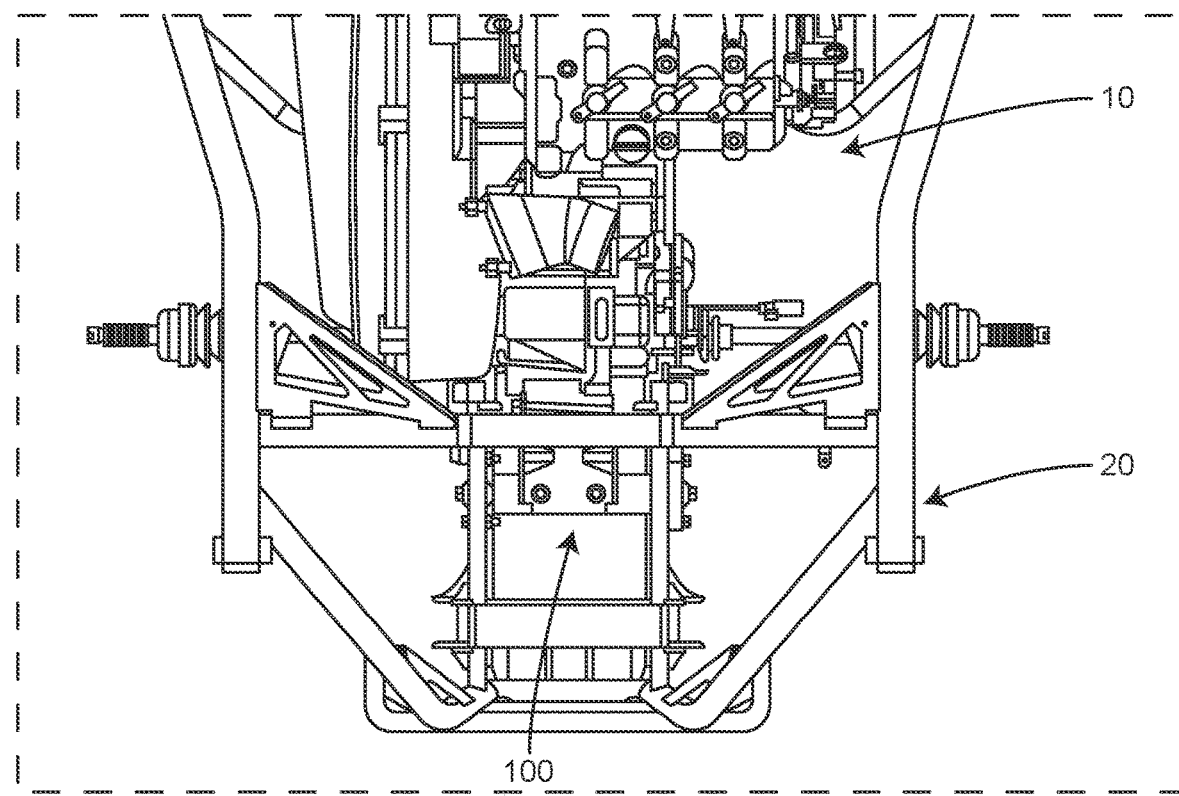
FIGS. 16A-16B illustrate an exemplary top view and a bottom view, respectively, of an installed engine assembly within a frame of an off-road vehicle in accordance with the present disclosure.
Figure 16B:
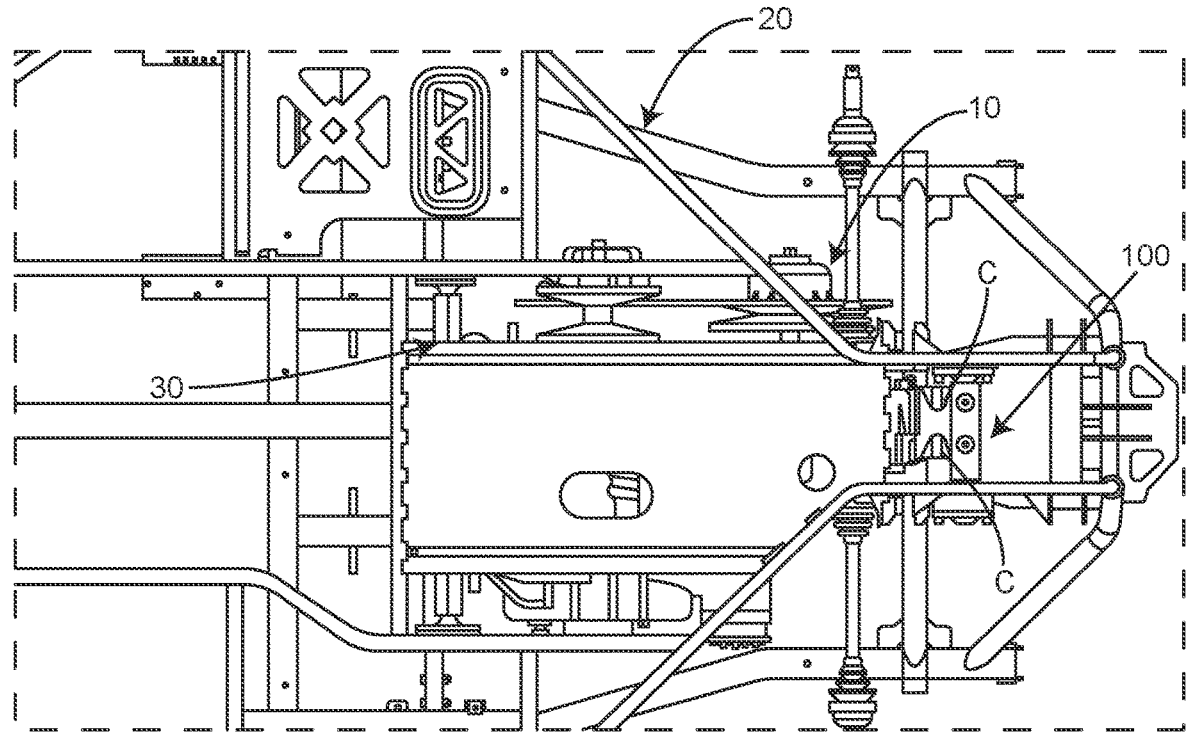

After installation of the engine assembly 10 in the engine area 24 and the attachment of the removable front central portion 210 to the front frame structure 200, a seat frame 230 is attached to the removable front central portion 210. In an embodiment, the seat frame 230 is attached to a front surface of the front central portion 210. The seat frame 230 may be attached to the removable front central portion 210 using at least one fourth fastener. FIGS. 14-16 illustrate different views of the installed engine assembly 10 in the engine area 24. More specifically, FIGS. 14A-14B illustrate exemplary views of an installed engine assembly within a frame of an off-road vehicle from a first side view thereof. The first side may be considered as a rear passenger side view. FIGS. 15A-15B illustrate exemplary views of an installed engine assembly within a frame of an off-road vehicle from a second side view thereof. The second side may be considered as a rear driver side view. FIGS. 16A-16B illustrate an exemplary top view and a bottom view, respectively, of the installed engine assembly 10 with the frame 20.

In an exemplary embodiment, the removable front central portion 210 may be configured to separate the engine area 24 with the seating area 22 after installation of the engine assembly 10.

In some embodiments, the vehicle 1 may include a different frame structure. In such embodiments, a frame transverse bar 250 in a rear frame structure may be elevated (seen e.g., in FIG. 12A) as compared to a frame transverse bar 250' (seen e.g., in FIG. 12B). Such elevated frame transverse bar 250 provides better space envelope to the engine assembly 10 in the engine area 24.

The fasteners used throughout the present disclosure may be nut and bolt fasteners used in automobile industry. In some embodiments, the bolt in such fasteners may have a hex-head, followed by a hex-headed cap screw and a stud.

It is to be noted that different values and parameters mentioned in the description are exemplary in nature and are not intended to bound the specification in any manner.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A rear mount assembly in an off-road vehicle for attaching an engine assembly to a frame, the rear mount assembly comprising:
    a rear mount bracket defined by a rear central portion having a first side edge, a second side edge, and a first supporting flange extending upwardly from the first side edge and a second supporting flange extending upwardly from the second side edge, the rear mount bracket configured to be attached to a rear part of the engine assembly at one or both of the first supporting flange and the second supporting flange;
    a rear transverse bar defined by a first end, a second end, and a rear central part extending therebetween, the rear central part having a top surface, the rear transverse bar configured to be attached to the rear central portion of the rear mount bracket at the top surface of the rear central part; and
    a pair of rear isolators configured to be attached to the rear transverse bar.

2. The rear mount assembly of claim 1, wherein at least one of the first supporting flange and the second supporting flange comprises at least one first hole for attaching the rear part of the engine assembly.

3. The rear mount assembly of claim 2, wherein at least one of the first supporting flange and the second supporting flange is attached to the rear part of the engine assembly via at least one first fastener corresponding to the at least one first hole.

4. The rear mount assembly of claim 1, wherein the rear central portion of the rear mount bracket is defined by an upper surface, a lower surface, and at least one second hole extending from the upper surface to the lower surface.

5. The rear mount assembly of claim 4, wherein the rear central portion is configured to be attached to the rear transverse bar via an at least one second fastener corresponding to the at least one second hole.

6. The rear mount assembly of claim 4, wherein the lower surface of the rear central portion abuts the top surface of the rear transverse bar when attached therewith.

7. The rear mount assembly of claim 1, wherein the pair of rear isolators comprises a first rear isolator configured to be attached to the first end of the rear transverse bar and a second rear isolator configured to be attached to the second end of the rear transverse bar.

8. The rear mount assembly of claim 7, wherein the first rear isolator and the second rear isolator are positioned in parallel to each other when attached with the first end and the second end of the rear transverse bar.

9. The rear mount assembly of claim 1, wherein the pair of rear isolators are positioned in parallel to a pair of front isolators of a front mount assembly.

10. The rear mount assembly of claim 1, wherein the rear central portion comprises an elevated triangular section extending from an upper surface thereof towards each of the pair of supporting flanges.

11. The rear mount assembly of claim 1, wherein the rear transverse bar is placed in a lateral direction of the vehicle.

12. An engine mount assembly for attaching an engine assembly to a frame, the engine assembly comprising a front part and a rear part, the frame comprising a front frame coupling and a rear frame coupling, said engine mount assembly comprising:
    a front mount assembly for attaching the front part of the engine assembly to the front frame coupling of the frame, the front mount assembly comprising a pair of front isolators; and
    a rear mount assembly for attaching the rear part of the engine assembly to the rear frame coupling of the frame, the rear mount assembly comprising:
    a rear mount bracket defined by a rear central portion having a first side edge, a second side edge, and first and second supporting flanges extending from each of the first side edge and the second side edge, respectively, the rear mount bracket configured to be attached to the rear part of the engine assembly at one or both of the first and second supporting flanges;
    a rear transverse bar defined by a first end, a second end, and a rear central part extending therebetween, the rear central part having at least a top surface, the rear transverse bar configured to be attached with the rear central portion of the rear mount bracket at the rear central part; and
    a pair of rear isolators configured to be attached to the rear transverse bar.

13. The engine mount assembly of claim 12, wherein the pair of rear isolators comprises a first rear isolator configured to be attached to the first end of the rear transverse bar and a second rear isolator configured to be attached to the second end of the rear transverse bar.

14. The engine mount assembly of claim 13, wherein the first rear isolator and the second rear isolator are positioned in parallel to each other when attached with the first end and the second end of the rear transverse bar.

15. The engine mount assembly of claim 12, wherein the pair of rear isolators are positioned in parallel the pair of front isolators.

16. A method of installing an engine assembly in an off-road vehicle, the off-road vehicle comprising a frame extending in a longitudinal direction of the vehicle and defining a seating area and an engine area, the frame having a front mount assembly comprising a pair of front isolators and a rear mount assembly comprising a rear mount bracket having a rear central portion and a pair of supporting flanges, a rear transverse bar, and a pair of rear isolators, the method comprising:
    attaching a rear part of the engine assembly with the pair of supporting flanges of the rear mount bracket using at least one first fastener;

attaching the rear transverse bar with the pair of rear isolators;

guiding the engine assembly towards the attached rear transverse bar such that a lower surface of the rear central portion abuts a top surface of the rear transverse bar; and attaching the rear mount bracket with the rear transverse bar using at least a second fastener.

17. The method of claim 16, wherein the step of guiding the engine assembly comprises the step of receiving the engine assembly at least partially within the seating area of the frame and moving the engine assembly in the longitudinal direction from the seating area to the engine area.

18. The method of claim 17, wherein the frame of the off-road vehicle includes a removable cross bar extending in a transverse direction and positioned rearward of the seating area; the method further comprising the step of removing the cross bar before receiving the engine assembly at least partially within the seating area of the frame.

19. The method of claim 16, wherein the step of guiding the engine assembly comprises the step of receiving the engine assembly in the engine area.

20. The method of claim 16, wherein the step of attaching the rear isolators comprises aligning the rear isolators parallel to the front isolators.

* * * * *